US010587343B2

(12) United States Patent
Mikami

(10) Patent No.: US 10,587,343 B2
(45) Date of Patent: Mar. 10, 2020

(54) SIGNAL LOOPBACK CIRCUIT AND SIGNAL LOOPBACK METHOD

(71) Applicant: NEC Corporation, Minato-ku, Tokyo (JP)

(72) Inventor: Satoshi Mikami, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/086,683

(22) PCT Filed: Mar. 22, 2017

(86) PCT No.: PCT/JP2017/011311
§ 371 (c)(1),
(2) Date: Sep. 20, 2018

(87) PCT Pub. No.: WO2017/170004
PCT Pub. Date: Oct. 5, 2017

(65) Prior Publication Data
US 2019/0097727 A1 Mar. 28, 2019

(30) Foreign Application Priority Data

Mar. 30, 2016 (JP) ................................. 2016-067181

(51) Int. Cl.
*H04B 10/077* (2013.01)
*H04B 10/035* (2013.01)
(Continued)

(52) U.S. Cl.
CPC ....... *H04B 10/2918* (2013.01); *H04B 10/035* (2013.01); *H04B 10/077* (2013.01);
(Continued)

(58) Field of Classification Search
CPC combination set(s) only.
See application file for complete search history.

(56) References Cited

U.S. PATENT DOCUMENTS 5,315,674 A * 5/1994 Asako .................. H04B 10/035
385/15
5,367,587 A 11/1994 Mizuochi et al.
(Continued)

FOREIGN PATENT DOCUMENTS

EP 0981215 A2 2/2000
EP 1037409 A2 9/2000
(Continued)

OTHER PUBLICATIONS

International Search Report for PCT Application No. PCT/JP2017/011311, dated Jun. 27, 2017.
(Continued)

*Primary Examiner* — Omar S Ismail

(57) ABSTRACT

Provided is a signal loopback circuit which, in order to loop back a monitoring signal in a relay device for relaying optical signals of a plurality of wavelength bands, connects between a channel of first direction and a channel of second direction through which an optical signal of first wavelength band and an optical signal of second wavelength band are transmitted, wherein the signal loopback circuit is provided with a first coupler for branching the optical signal on the channel of first direction, a first filter for extracting at least one of a monitoring signal of first wavelength band and a monitoring signal of second wavelength band that are used in the channel of first direction from the optical signal branched by the first coupler, and a second coupler for causing the monitoring signal extracted by the first filter to be joined to the channel of the second direction.

15 Claims, 7 Drawing Sheets

(51) Int. Cl.
*H04B 10/297* (2013.01)
*H04B 10/291* (2013.01)
*H04B 10/29* (2013.01)

(52) U.S. Cl.
CPC ......... *H04B 10/0777* (2013.01); *H04B 10/29* (2013.01); *H04B 10/297* (2013.01); *H04B 2210/078* (2013.01)

(56) References Cited

U.S. PATENT DOCUMENTS

| | | | | |
|---|---|---|---|---|
| 5,500,756 | A * | 3/1996 | Tsushima | H04B 10/0777 398/177 |
| 5,790,294 | A * | 8/1998 | Horiuchi | H04B 10/035 370/249 |
| 6,587,242 | B1 * | 7/2003 | Shake | H04B 10/0775 398/98 |
| 6,603,587 | B1 | 8/2003 | Yokoyama et al. | |
| 7,336,901 | B1 * | 2/2008 | Soulliere | H04J 14/0204 398/24 |
| 2002/0051284 | A1 * | 5/2002 | Takatsu | G06F 12/0866 359/341.1 |
| 2002/0101633 | A1 * | 8/2002 | Onaka | H04J 14/0204 398/59 |
| 2002/0131696 | A1 | 9/2002 | Yokoyama et al. | |
| 2009/0324249 | A1 | 12/2009 | Zhang | |
| 2011/0069950 | A1 * | 3/2011 | Ito | H04B 1/74 398/9 |
| 2011/0229128 | A1 * | 9/2011 | Sakamoto | H04B 10/0775 398/29 |
| 2014/0072298 | A1 * | 3/2014 | Hou | H04B 10/0773 398/16 |
| 2014/0086573 | A1 | 3/2014 | Zhang et al. | |
| 2017/0310390 | A1 * | 10/2017 | Shiner | H04B 10/0775 |

FOREIGN PATENT DOCUMENTS

| | | |
|---|---|---|
| JP | H05-292037 A | 11/1993 |
| JP | H09-247106 A | 9/1997 |
| JP | 2000-059306 A | 2/2000 |
| JP | 2001-053685 A | 2/2001 |
| JP | 2002-280968 A | 9/2002 |

OTHER PUBLICATIONS

English translation of Written opinion for PCT Application No. PCT/JP2017/011311.
Extended European Search Report for EP Application No. EP17774545.2 dated Nov. 12, 2019.

* cited by examiner

SIGNAL LOOPBACK CIRCUIT AND SIGNAL LOOPBACK METHOD

This application is a National Stage Entry of PCT/JP2017/011311 filed on Mar. 22, 2017, which claims priority from Japanese Patent Application 2016-067181 filed on Mar. 30, 2016, the contents of all of which are incorporated herein by reference, in their entirety.

TECHNICAL FIELD

The present invention relates to a signal loopback circuit and a signal loopback method that are used in an optical submarine cable system.

BACKGROUND ART

FIG. 7 is a block diagram illustrating a configuration example of a relay device 900 related to the present invention. The relay device 900 is a repeater (optical repeater) for an optical signal, which is used in an optical submarine cable system. The relay device 900 includes optical amplifiers 901 and 902. The optical amplifiers 901 and 902 are designed in such a way as to be suitable for amplification of a C-band optical signal. Note that in the present patent application, the term "C-band" indicates a wavelength band approximately ranging from 1530 nm to 1565 nm.

From an uplink input (UP IN) in FIG. 7, an uplink-channel optical signal whose carrier wavelength is within the C-band is wavelength-multiplexed and input. The input uplink-channel optical signal is amplified by the optical amplifier 901. The uplink optical signal amplified by the optical amplifier 901 is output from an uplink output (UP OUT). From a downlink input (DOWN IN) in FIG. 7, a downlink-channel optical signal whose carrier wavelength is within the C-band is wavelength-multiplexed and input. The input downlink-channel optical signal is amplified by the optical amplifier 902. The optical signal amplified by the optical amplifier 902 is output from a downlink output (DOWN OUT). Optical signals input and output in the relay device 900 are transmitted between the relay device 900 and a land device or another relay device.

At the outputs of the optical amplifiers 901 and 902, signal loopback circuits 903 and 904 are provided respectively. The signal loopback circuits 903 and 904 are each constituted of an optical fiber grating and two optical couplers. The signal loopback circuits 903 and 904 reflect monitoring signals among optical signals output from the optical amplifiers 901 and 902 respectively, and loop back the reflected signals to channels in the opposite directions. The monitoring signal is a signal for monitoring a system and has a wavelength different from that of data to be transmitted. The monitoring signals looped back by the signal loopback circuits 903 and 904 are looped back to land devices by using opposite optical channels. The land device can remotely monitor an operation of the relay device 900 by using the looped-back monitoring signal. For example, a downlink-channel monitoring signal included in an optical signal output from the optical amplifier 901 is combined to an uplink-channel optical signal by the signal loopback circuit 904. As a result, the land device connected to the uplink output (UP OUT) can receive the downlink-channel monitoring signal.

In relation to the present invention, PTL 1 describes an optical amplification relay system including an optical loopback circuit for a monitoring signal.

CITATION LIST

Patent Literature

PTL 1: Japanese Unexamined Patent Application Publication No. 2002-280968

SUMMARY OF INVENTION

Technical Problem

In order that a capacity of an optical submarine cable system is made large, an optical relay device capable of amplifying an L-band optical signal, in addition to a C-band optical signal widely used up to the present, has been studied. However, the relay device 900 illustrated in FIG. 7 and the invention described in PTL 1 do not include a configuration for looping back a monitoring signal in a system in which an optical signal having a plurality of wavelength bands (i.e., the C-band and the L-band) is transmitted. Note that in the present patent application, the term "L-band" indicates a wavelength band approximately ranging from 1570 nm to 1610 nm.

Object of Invention

An object of the present invention is to provide a technique for looping back a monitoring signal in a relay device that relays an optical signal having a plurality of wavelength bands.

Solution to Problem

A signal loopback circuit according to the present invention is a signal loopback circuit that makes connection between a channel of a first direction and a channel of a second direction, through which an optical signal of a first wavelength band and an optical signal of a second wavelength band are transmitted, the signal loopback circuit including:

a first coupler that splits an optical signal of the channel of the first direction;

a first filter that is used in the channel of the first direction and that extracts, from an optical signal split by the first coupler, at least one of a monitoring signal of the first wavelength band and a monitoring signal of the second wavelength band; and a second coupler that combines, to a second channel, a monitoring signal extracted by the first filter.

A signal loopback method according to the present invention is a signal loopback method of making connection between a channel of a first direction and a channel of a second direction, through which an optical signal of a first wavelength band and an optical signal of a second wavelength band are transmitted, the signal loopback method including:

splitting an optical signal of the channel of the first direction;

extracting, from the split optical signal, at least one of a monitoring signal of the first wavelength band and a monitoring signal of the second wavelength band that are used in the channel of the first direction; and combining the extracted monitoring signal to a second channel.

Advantageous Effects of Invention

In a relay device that relays an optical signal having a plurality of wavelength bands, a monitoring signal can be looped back.

EXAMPLE EMBODIMENT

Figure 1:
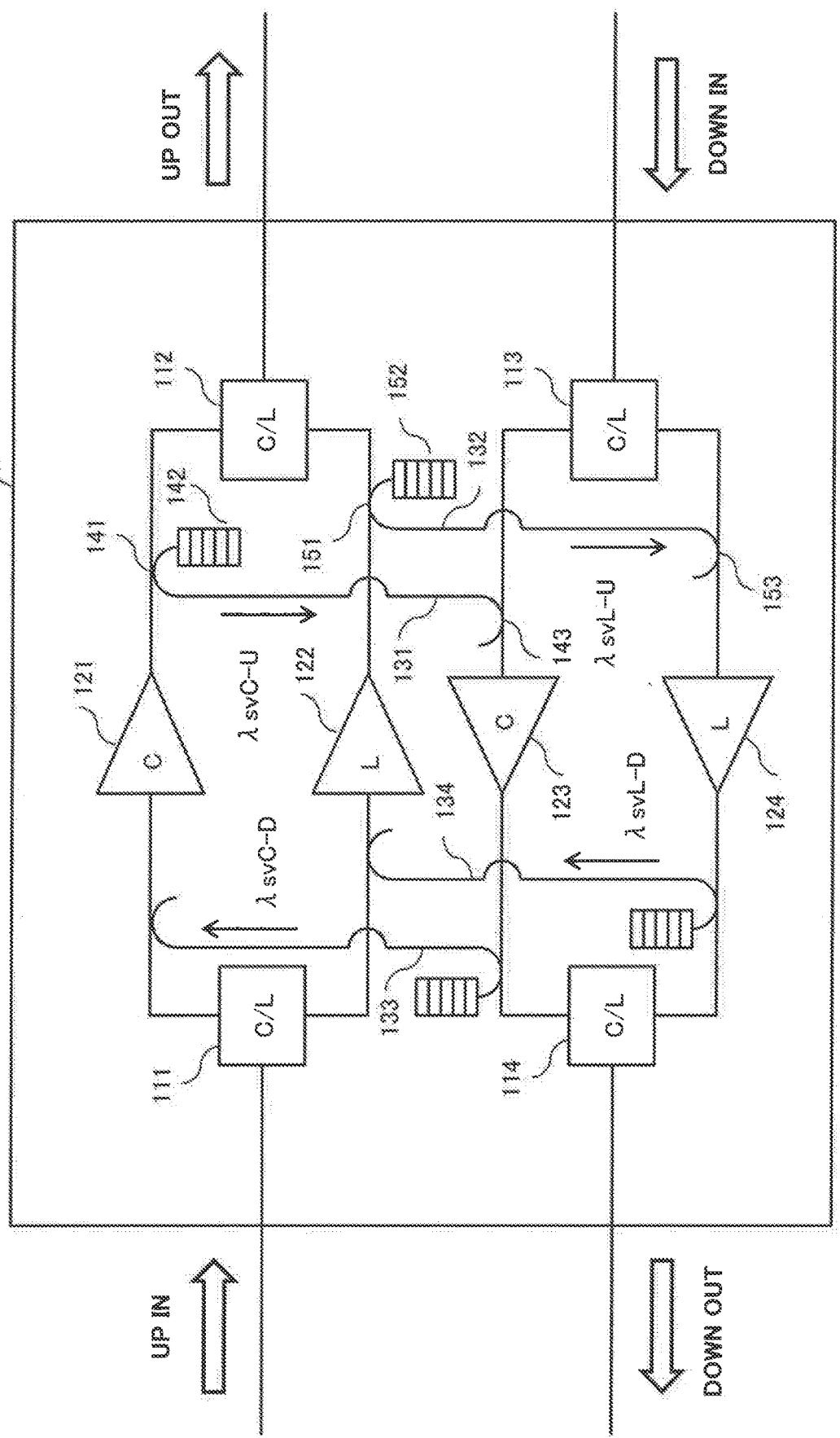
FIG. 1 is a block diagram illustrating a configuration example of a relay device 100 according to a first example embodiment.

FIG. 1 is a block diagram illustrating a configuration example of a relay device 100 according to a first example embodiment of the present invention. The relay device 100 is, for example, a submarine repeater used in an optical submarine cable system. In the drawings mentioned below, the arrows attached to signals are given for illustration of an operation example, and do not limit types and directions of the signals.

To the relay device 100, four submarine cables are connected. "UP IN" is an input of an uplink signal, "UP OUT" is an output of an uplink signal, "DOWN IN" is the input of a downlink signal, and "DOWN OUT" is the output of a downlink signal. The relay device 100 has a relay function of amplifying bidirectional optical signals in the uplink direction and the downlink direction. The relay device 100 includes a multiplexing-demultiplexing devices 111 to 114, optical amplifiers 121 to 124, and signal loopback circuits 131 to 134. The multiplexing-demultiplexing devices 111 to 114 are, for example, optical wavelength filters, and multiplex and demultiplex optical signals of wavelength bands in the C-band and the L-band. A wavelength of an optical signal passing through the signal loopback circuits 131 to 134 is described with reference to FIG. 2.

The optical amplifiers 121 and 123 are optical fiber amplifiers designed in such a way as to be suitable for amplification of a C-band optical signal. The optical amplifiers 122 and 124 are optical fiber amplifiers designed in such a way as to be suitable for amplification of an L-band optical signal.

An uplink optical signal input from the UP IN is a wavelength-multiplexed signal including optical signals of C-band and L-band. In the multiplexing-demultiplexing device 111, the uplink optical signal is separated into the C-band optical signal and the L-band optical signal. The C-band optical signal is amplified by the optical amplifier 121. The L-band optical signal is amplified by the optical amplifier 122. The optical signals amplified by the optical amplifiers 121 and 122 are wavelength-multiplexed by the multiplexing-demultiplexing device 112, and are output from the UP OUT. The UP OUT is connected to another adjacent relay device or a land device. In the procedure similar to the optical signal in the uplink direction, an optical signal in the downlink direction input from the DOWN IN is also amplified by the optical amplifier 123 or the optical amplifier 124, and is output from the DOWN OUT.

Each of the signal loopback circuits 131 to 134 has a function of reflecting an optical signal with a part of wavelengths of an optical signal output from the optical amplifiers 121 to 124 and looping back the reflected signal by using the channel in the opposite direction. Each of the signal loopback circuits 131 to 134 includes a reflecting element and two optical couplers.

A configuration and an operation of the signal loopback circuits 131 to 134 are described by citing the signal loopback circuit 131 as an example. The signal loopback circuit 131 includes couplers 141 and 143, and a reflecting element 142. Optical directional couplers can be used for the couplers 141 and 143. An optical fiber grating can be used for the reflection element 142. An optical signal output from the optical amplifier 121 is split by the coupler 141 of the signal loopback circuit 131, and is made incident on the reflecting element 142. The reflecting element 142 reflects only an optical signal having a part of wavelengths of the incident optical signal. Specifically, the reflecting element 142 reflects only an optical signal having a wavelength of a C-band monitoring signal of the uplink channel. In other words, the reflecting element 142 extracts the C-band monitoring signal of the uplink channel.

The reflected monitoring signal is input to the optical amplifier 123 for the downlink direction, via the couplers 141 and 143. Since the optical amplifier 123 is a C-band amplifier, the monitoring signal of the uplink channel as well as an optical signal of the downlink channel is amplified by the optical amplifier 123.

In this manner, the signal loopback circuit 131 can loop back, to the downlink transmission path, an optical signal (i.e., a monitoring signal) having a part of wavelengths of a C-band uplink optical signal. By reflecting the monitoring signal in the C-band uplink signal by the signal loopback circuit 131, the monitoring signal of the uplink channel can be transmitted to a land device on a path of the downlink channel. As a result, at the land device connected to the downlink channel, the uplink channel of the relay device 100 can be remotely monitored.

The relay device 100 illustrated in FIG. 1 includes signal loopback circuits respectively in the transmission paths for wavelength bands of both of the C-band and L-band. In other words, the signal loopback circuit 131 is used for looping back a C-band monitoring signal of the uplink, and the signal loopback circuit 132 is used for looping back an L-band monitoring signal of the uplink. The signal loopback circuit 132 is constituted by couplers 151 and 153 and a reflecting element 152. Optical directional couplers can be used for the couplers 151 and 153. An optical fiber grating can be used for the reflecting element 152. An optical signal output from the optical amplifier 122 is split by the coupler 151 of the signal loopback circuit 132, and is made incident on the reflecting element 152. The reflecting element 152 reflects only an optical signal having a part of wavelength of the incident optical signal. Specifically, the reflecting element 152 reflects only the optical signal having the wavelength of the L-band monitoring signal of the uplink channel. The reflected monitoring signal is input to the optical amplifier 124 for the downlink direction via the couplers 151 and 153. Similarly, the signal loopback circuit 133 is used for looping back a C-band monitoring signal of the downlink, and the signal loopback circuit 134 is used for looping back an L-band monitoring signal of the downlink.

With such a configuration, a monitoring signal is transmitted to a land device connected to the channel in the opposite direction. As a result, an uplink-channel land device connected with the uplink output (UP OUT) can monitor the downlink channel for both of the C-band and the L-band. Further, a downlink-channel land device connected with the downlink output (DOWN OUT) can monitor the uplink channel for both of the C-band and the L-band.

Figure 2:
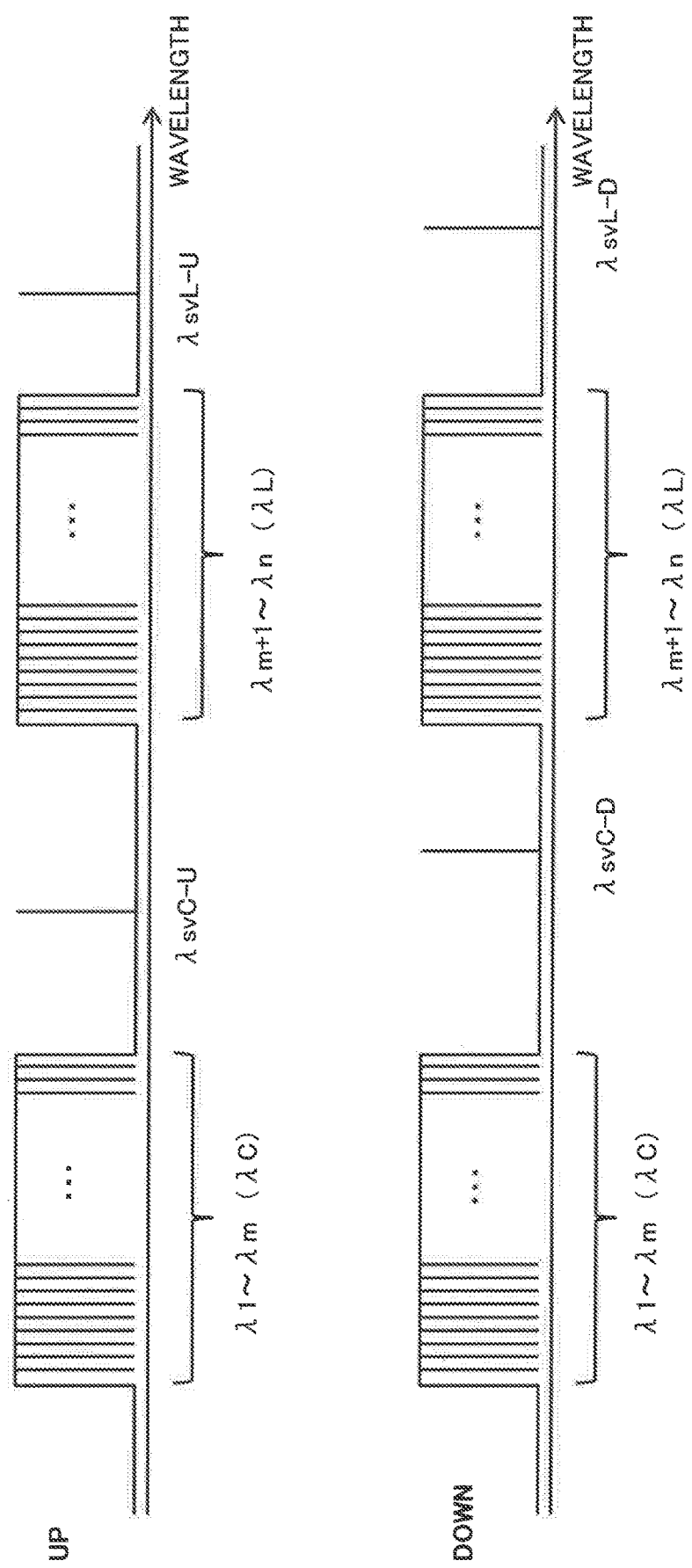
FIG. 2 is a diagram illustrating an example of wavelengths of an optical signal passing through the relay device 100.

FIG. 2 is a diagram illustrating an example of wavelengths of an optical signal passing through the relay device 100. The uplink signal indicated by "UP" in FIG. 2 includes wavelength-multiplexed signals of wavelengths $\lambda 1$ to $\lambda m$ and wavelengths $\lambda m+1$ to $\lambda n$, and monitoring signals of wavelength $\lambda svC$-U and wavelength $\lambda svL$-U. The downlink signal indicated by DOWN in FIG. 2 includes wavelength-multiplexed signals of wavelengths $\lambda 1$ to $\lambda m$ and wavelengths $\lambda m+1$ to $\lambda n$, and monitoring signals of wavelengths $\lambda svC$-D and $\lambda svL$-D. The symbols m and n are natural numbers satisfying m<n. The optical signal of the wavelengths $\lambda 1$ to $\lambda m$ (generically referred to as $\lambda C$) is a main signal of the C-band, and the optical signal of the wavelengths $\lambda m+1$ to $\lambda n$ (generically referred to as $\lambda L$) is a main signal of the L-band. In other words, the main signal of the C-band has been multiplexed with m wavelengths at the maximum, and the main signal of the L-band has been multiplexed with n-m wavelengths at the maximum.

The monitoring signals of wavelengths $\lambda svC$-U and $\lambda svL$-U are a C-band monitoring signal of the uplink channel and an L-band monitoring signal of the uplink channel, respectively. The monitoring signals of the wavelengths $\lambda svC$-D and $\lambda svL$-D are the C-band monitoring signal of the downlink channel and the L-band monitoring signal of the downlink channel, respectively. The wavelengths $\lambda svC$-U, $\lambda svL$-U, $\lambda svC$-D, and $\lambda svL$-D of the monitoring signals are different from each other, and do not overlap with the wavelengths of the main signals. Further, each of the monitoring signals may include signals of a plurality of wavelengths.

The relay device 100 with such a configuration can relay an optical signal having a plurality of wavelength bands, and can loop back a monitoring signal. In particular, the relay device 100 includes the signal loopback circuit for each of the C-band optical signal and the L-band optical signal, and thereby, can loop back monitoring signals of the L-band as well as the C-band. Further, since the looped-back monitoring signals are multiplexed on the input side of one of the optical amplifiers 121 to 124, the monitoring signals are amplified by the optical amplifier and then output. As a result, an optical level of the monitoring signal output from the relay device 100 is raised, and monitoring sensitivity at a land device is improved.

Second Example Embodiment

Figure 3:
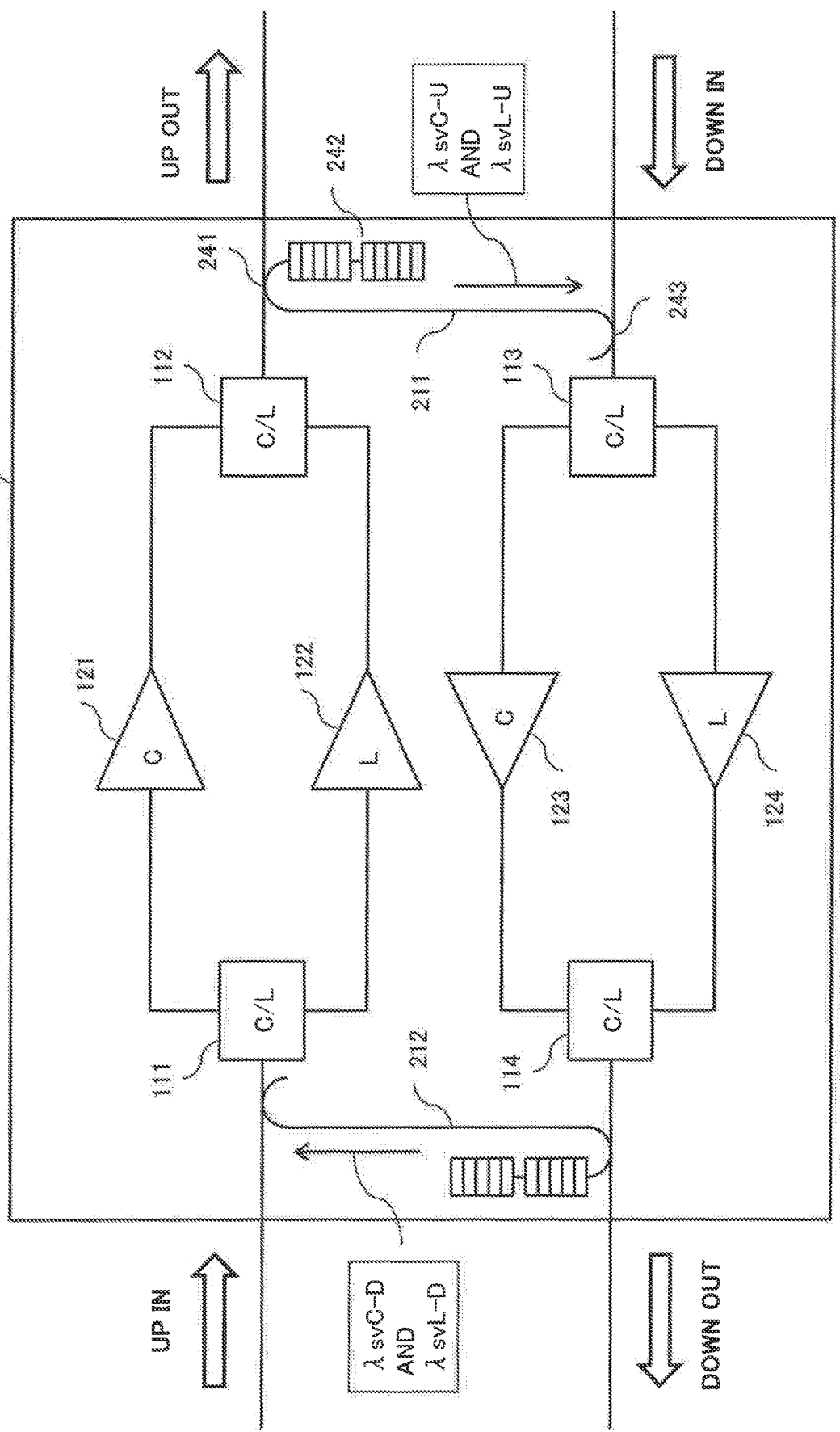
FIG. 3 is a block diagram illustrating a configuration example of a relay device 200 according to a second example embodiment.

FIG. 3 is a block diagram illustrating a configuration example of a relay device 200 according to a second example embodiment of the present invention. Similarly to the relay device 100 according to the first example embodiment, the relay device 200 is a repeater used in an optical submarine cable system. In the following description of the example embodiment, the same reference symbols are attached to the elements described above, and the overlapping description is appropriately omitted.

In comparison with the relay device according to the first example embodiment, the relay device 200 includes signal loopback circuits 211 and 212 instead of the signal loopback circuits 131 to 134. The signal loopback circuits 211 and 212 each have a function of looping back, to the channel in the opposite direction, an optical signal with a part of wavelengths of an optical signal output from the multiplexing-demultiplexing devices 112 and 114. Each of the signal loopback circuits 211 and 212 includes two reflecting elements and two optical couplers.

The function of the signal loopback circuits 211 and 212 is described by citing the signal loopback circuit 211 as an example. The signal loopback circuit 211 is constituted by couplers 241, 243 and a reflecting element 242. Optical directional couplers can be used for the couplers 241 and 243. Two optical fiber gratings connected in series can be used for the reflecting element 242. The multiplexing-demultiplexing device 112 wavelength-multiplexes and outputs a C-band optical signal and an L-band optical signal. The wavelength-multiplexed optical signal is split by the coupler 241 of the signal loopback circuit 211, and is made incident on the reflecting element 242. The reflecting element 242 includes two fiber gratings whose reflection wavelengths are different from each other. Thus, two optical signals whose wavelengths are different from each other are reflected at the reflecting element 242. The reflected optical signals are input to the multiplexing-demultiplexing device 113 in the downlink direction via the couplers 241 and 243. The optical signals reflected by the reflection element 242 are amplified by the optical amplifier 123 or 124 corresponding to the wavelengths thereof, are multiplexed by the multiplexing-demultiplexing device 114, and are output from the DOWN OUT. In this manner, the signal loopback circuit 211 can loop back, to the downlink channel, the optical signal having a part of wavelengths of the uplink optical signals of the C-band and the L-band.

The signal loopback circuit 211 can loop back, to the downlink channel, a C-band monitoring signal (a wavelength $\lambda svC$-U) of the uplink channel and an L-band monitoring signal (a wavelength $\lambda svL$-U) of the uplink channel. As a result, the uplink-channel monitoring signals of both the C-band and the L-band are transmitted to a land device connected to the downlink channel, and in the land device, the uplink channel of the relay device 200 can be remotely monitored. Similarly, since the signal loopback circuit 212 can loop back downlink-channel monitoring signals (wavelengths $\lambda svC$-D and $\lambda svL$-D) of both the C-band and the L-band, the downlink channel of the relay device 200 can be remotely monitored in a land device connected to the uplink channel.

The relay device 200 according to the second example embodiment can relay an optical signal having a plurality of wavelength bands, and can loop back monitoring signals. In particular, by one signal loopback circuit 211 or 212, the relay device 200 loops back the optical signal multiplexed by the multiplexing-demultiplexing device 112 or 114, and thus, has a configuration simplified as compared with the relay device 100 according to the first example embodiment. Further, similarly to the relay device 100 according to the first example embodiment, in the relay device 200, the looped-back monitoring signals are multiplexed on the input side of the optical amplifier, and thus, the monitoring signals are amplified by the optical amplifier and output. As a result, an optical level of the monitoring signal is raised, and monitoring sensitivity at a land device is improved.

Third Example Embodiment

Figure 4:
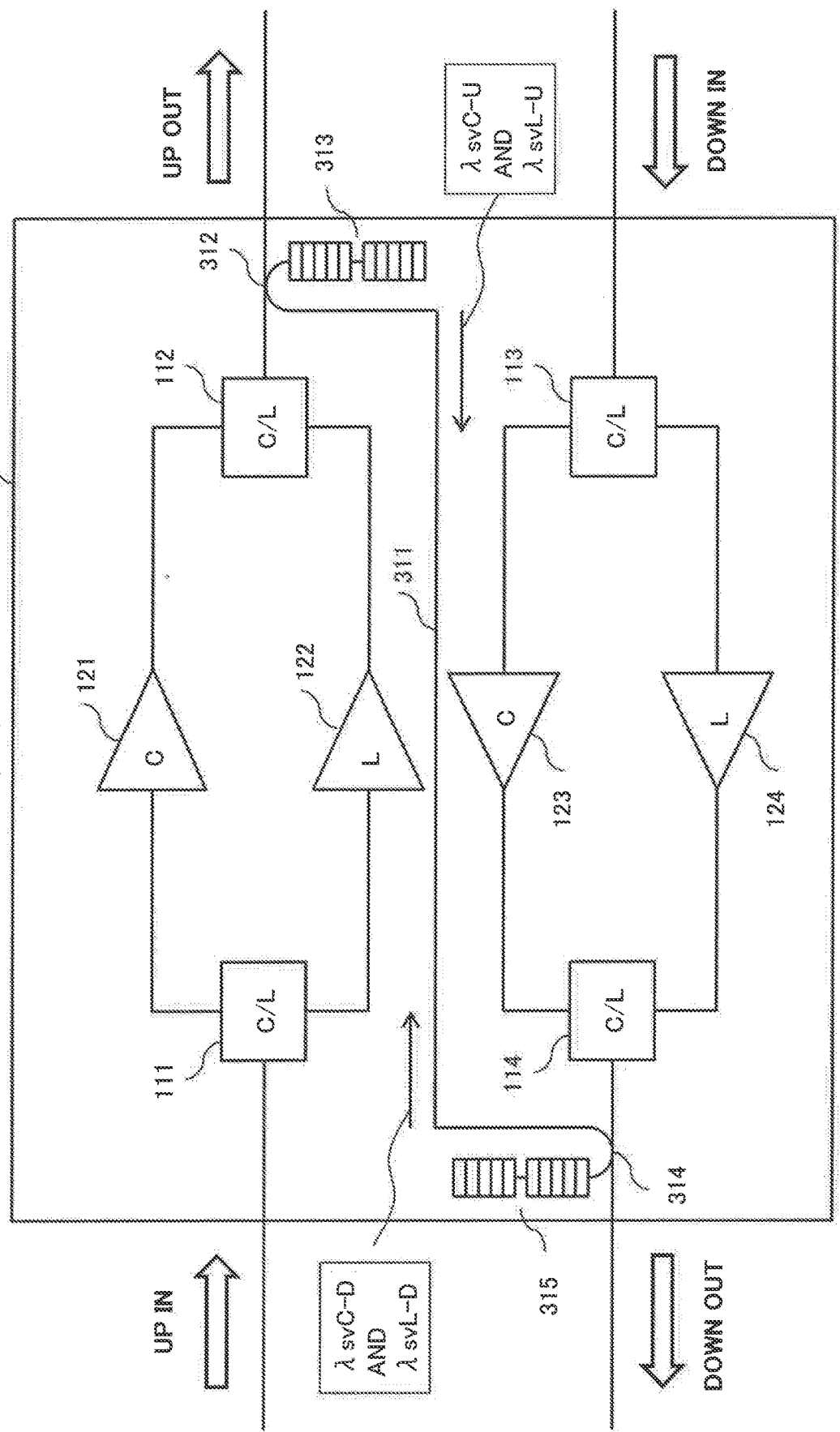
FIG. 4 is a block diagram illustrating a configuration example of a relay device 300 according to a third example embodiment.

FIG. 4 is a block diagram illustrating a configuration example of a relay device 300 according to a third example embodiment of the present invention. Similarly to the relay device 200 according to the second example embodiment, the relay device 300 is a submarine repeater used in an optical submarine cable system.

In comparison with the relay device 200 according to the second example embodiment, the relay device 300 includes a signal loopback circuit 311 instead of the signal loopback circuits 211 and 212. The signal loopback circuit 311 has a function of, by using the optical transmission path in the opposite direction, looping back an optical signal with a part of wavelengths of an optical signal output from the multiplexing-demultiplexing devices 112 and 114. The signal loopback circuit 311 includes two pairs of reflecting elements and two optical couplers.

The function of the signal loopback circuit 311 is described. The signal loopback circuit 311 includes couplers 312 and 314, and reflecting elements 313 and 315. Optical directional couplers can be used for the couplers 312 and 314. Two optical fiber gratings connected in series can be used for the reflecting elements 313 and 315, respectively.

An uplink-channel optical signal output from the multiplexing-demultiplexing device 112 is split by the coupler 312 of the signal loopback circuit 311, and is made incident on the reflecting element 313. The reflecting element 313 reflects only an optical signal having a part of wavelengths of the incident optical signal. The reflecting element 313 includes, for example, two fiber gratings whose reflection wavelengths are different from each other. Thus, an optical signal having at least two wavelengths is reflected at the reflecting element 313. The reflected optical signal is combined to the downlink channel via couplers 312 and 314, and is output from the DOWN OUT. In this manner, the signal loopback circuit 311 can loop back, to the downlink transmission path, the optical signal having a part of wavelengths of the uplink-channel optical signal of the C-band and L-band.

By reflecting uplink monitoring signals (wavelengths $\lambda svC$-U and $\lambda svL$-U) of the C-band and the L-band by the reflecting element 313, uplink-channel monitoring signals of both the C-band and the L-band can be transmitted, by using the downlink channel, to a land device connected to the downlink channel. As a result, the uplink channel of the relay device 300 can be remotely monitored in a land device connected to the downlink channel. Similarly, the signal loopback circuit 311 reflects downlink monitoring signals (wavelengths $\lambda svC$-D and $\lambda svL$-D) of the C-band and the L-band by the reflecting element 315, and thereby, can loop back, to the uplink channel, downlink monitoring signals of both the C-band and the L-band.

The relay device 300 according to the third example embodiment can relay an optical signal having a plurality of wavelength bands, and can loop back uplink monitoring signals of both the C-band and the L-band, at the signal loopback circuit 311. Further, the relay device 300 loops back monitoring signals of both the uplink channel and the downlink channel by one signal loopback circuit 311, and thus, has a configuration further simplified as compared with the relay device 200.

Fourth Example Embodiment

Figure 5:
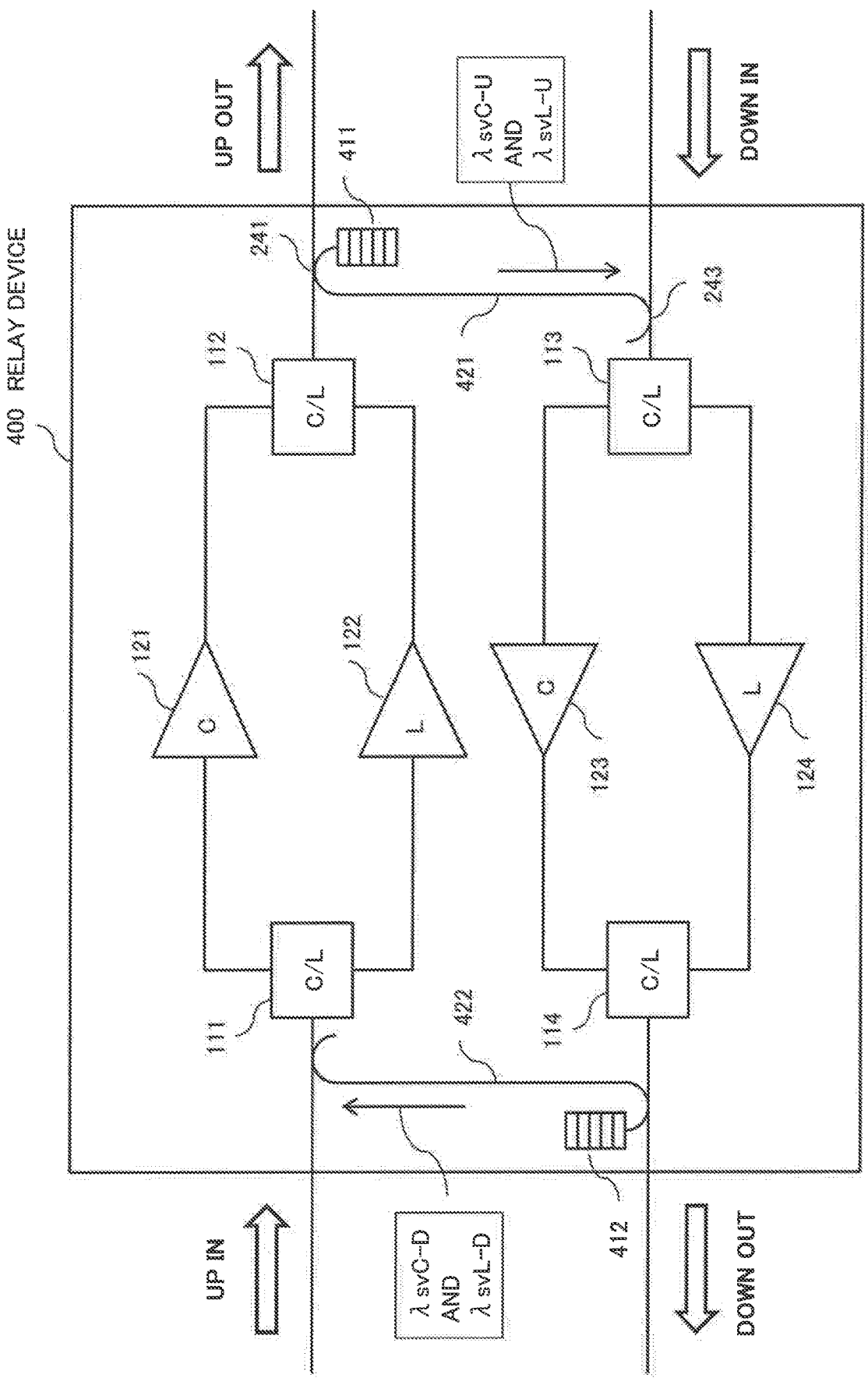
FIG. 5 is a block diagram illustrating a configuration example of a relay device 400 according to a fourth example embodiment.

FIG. 5 is a block diagram illustrating a configuration example of a relay device 400 according to a fourth example embodiment of the present invention. Similarly to the relay device 200 according to the second example embodiment, the relay device 400 is a submarine repeater used in an optical submarine cable system.

In comparison with the relay device 200 according to the second example embodiment, the relay device 400 includes reflecting elements 411 and 412. The reflecting element 411 reflects only a C-band monitoring signal having a wavelength of $\lambda svC$-U in the uplink channel, and the reflecting element 412 reflects only a C-band monitoring signal having a wavelength of $\lambda svC$-D in the downlink channel. Signal loopback circuits 421 and 422 with such a configuration loop back only C-band monitoring signals to the channels on the opposite sides.

A pump laser diode that excites an amplification medium is sometimes shared by the C-band optical amplifier 121 and the L-band optical amplifier 122. For this reason, for example, when an output of pump light decreases due to malfunction of the pump laser diode of the uplink channel, outputs of both of the optical amplifiers 121 and 122 decrease. Thus, looping back only a C-band monitoring signal in the uplink channel enables malfunction of the pump laser diode in the uplink channel to be monitored by a land device in the downlink channel. Similarly, malfunction of a pump laser diode in the downlink channel is detected as well. Note that the signal loopback circuits 421 and 422 may loop back only an L-band monitoring signal to the channel on the opposite side, and malfunction of a pump laser diode may be monitored by an L-band monitoring signal.

In this manner, the relay device 400 according to the fourth example embodiment can relay an optical signal having a plurality of wavelength bands, and can loop back a monitoring signal. At the signal loopback circuits 421 and 422, the relay device 400 loops back the monitoring signal of one of the C-band and the L-band. Then, land devices can detect malfunction of the relay device 400 due to malfunction of pump laser diodes by the monitoring signals. It is sufficient that the signal loopback circuits 421 and 422 reflect monitoring signals having only one of the C-band and the L-band, and thus, configurations of the signal loopback circuits can be simplified as compared with the relay devices according to the first to third example embodiments.

Fifth Example Embodiment

Figure 6:
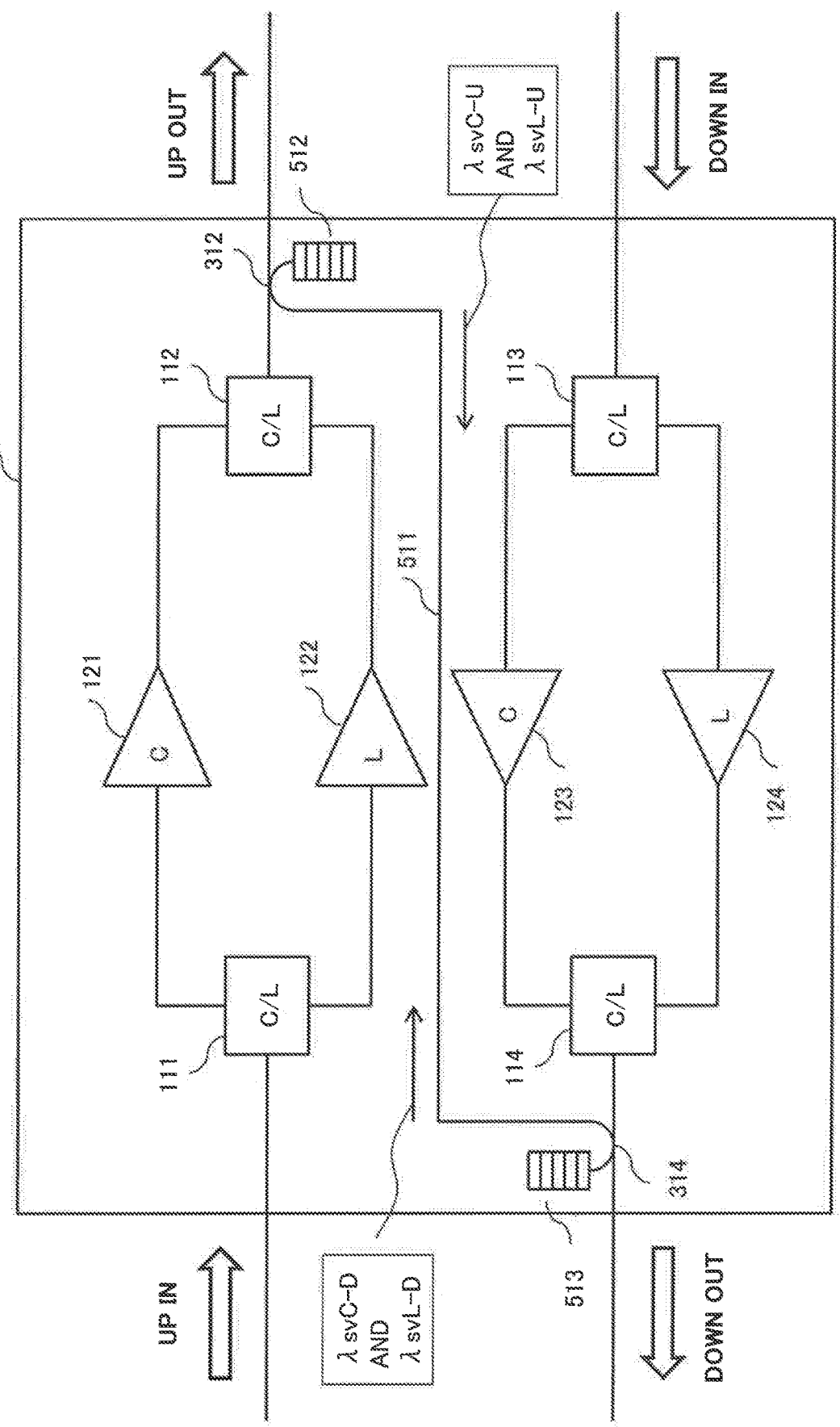
FIG. 6 is a block diagram illustrating a configuration example of a relay device 500 according to a fifth example embodiment.
Figure 7:
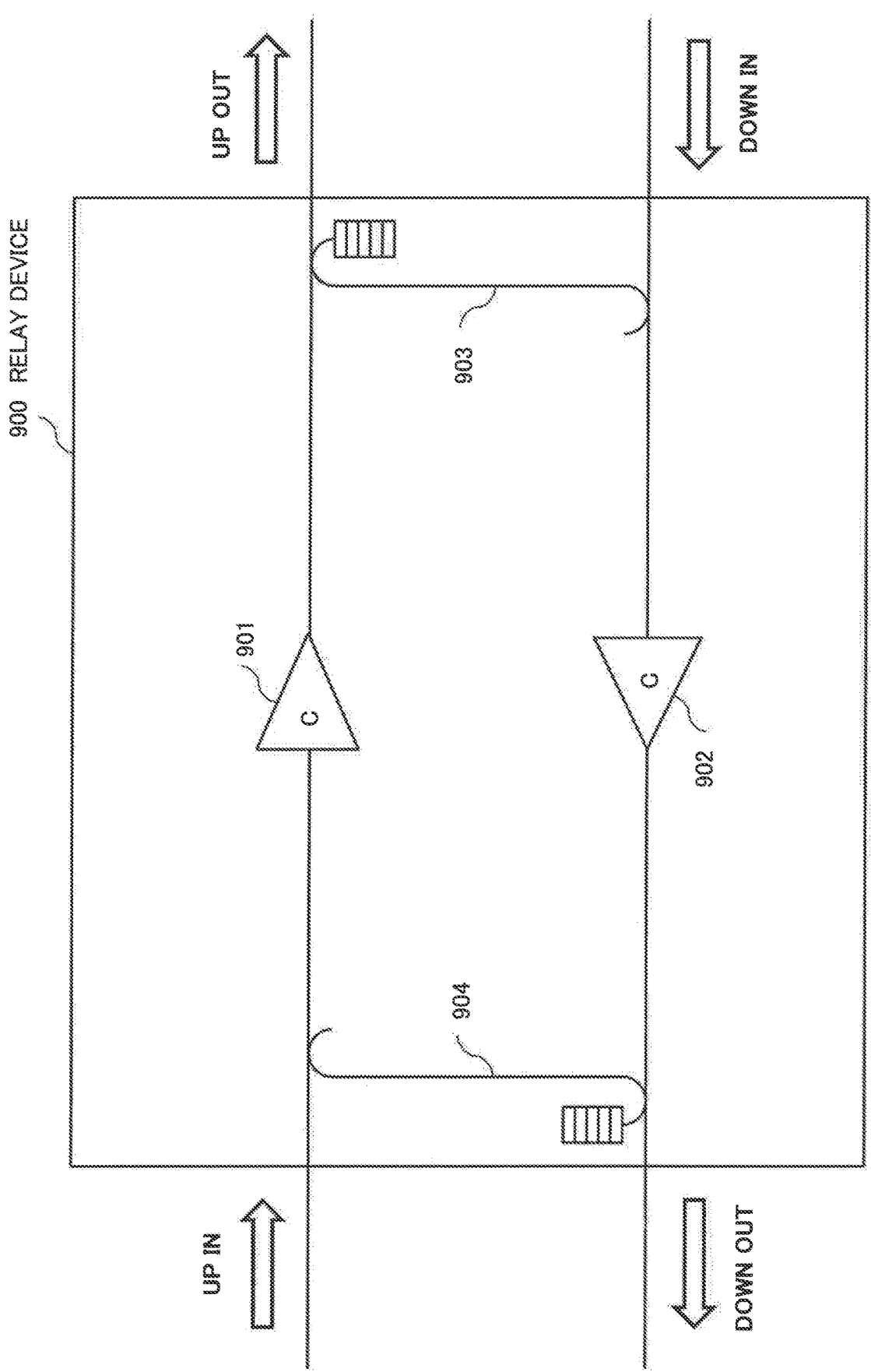
FIG. 7 is a block diagram illustrating a configuration example of a relay device 900 related to the present invention.

FIG. 6 is a block diagram illustrating a configuration example of a relay device 500 according to a fifth example embodiment of the present invention. The relay device 500 includes a signal loopback circuit 511. The relay device 500 includes a configuration in which the reflecting elements 313 and 315 of the relay device 300 according to the third example embodiment are replaced with the reflecting elements 512 and 513 that reflect only the monitoring signal of the C-band or the L-band, similarly to the fourth example embodiment.

Similarly to the relay device 400 according to the fourth example embodiment, the relay device 500 loops back only the monitoring signal of one of the C-band and the L-band, and thereby, can notify a land device of malfunction of the relay device 500 due to malfunction of a pump laser diode. It is sufficient that the signal loopback circuit 511 reflects the monitoring signal of one of the C-band and the L-band, and thus, a configuration of the signal loopback circuit can be simplified as compared with the relay device according to the first to third example embodiments.

Sixth Example Embodiment

The advantageous effect of the present invention is also achieved by a signal loopback circuit of a sixth example embodiment described below. In the following, with reference to FIG. 5, the correspondence to the names or reference symbols of the respective elements according to the fourth example embodiment is written in parentheses. In other words, the signal loopback circuit (421) is a signal loopback circuit that makes connection between the channel of a first direction (UP) and the channel of a second direction (DOWN) through which an optical signal of a first wavelength band (C-band) and an optical signal of a second wavelength band (L-band) are transmitted.

The first coupler (241) splits an optical signal in the channel of the first direction. The first filter (411) extracts, from the optical signal split by the first coupler, at least one of a monitoring signal of the first wavelength band and a monitoring signal of the second wavelength band that are used in the channel of the first direction. The second coupler (243) combines, to the channel of second direction, the monitoring signal ($\lambda svC$-U or $\lambda svL$-U) extracted by the first filter.

The signal loopback circuit with such a configuration also enables a monitoring signal to be looped back in the relay device that relays an optical signal having a plurality of wavelength bands.

Note that the example embodiments of the present invention can also be described as in the following supplementary notes, but are not limited to these.

(Supplementary Note 1)

A signal loopback circuit that makes connection between a channel of a first direction and a channel of a second direction, through which an optical signal of a first wavelength band and an optical signal of a second wavelength band are transmitted, including:

a first coupler that splits an optical signal of the channel of the first direction;

a first filter that is used in the channel of the first direction and that extracts, from an optical signal split by the first coupler, at least one of a monitoring signal of the first wavelength band and a monitoring signal of the second wavelength band; and a second coupler that combines, to a channel of second direction, a monitoring signal extracted by the first filter.

(Supplementary Note 2)

The signal loopback circuit according to supplementary note 1, wherein the first and second couplers and the first filter are arranged for each of a channel of an optical signal of the first wavelength band and a channel of an optical signal of the second wavelength band that are separated, and the first filter extracts the monitoring signal of the wavelength band of the channel at which the first filter is arranged.

(Supplementary Note 3)

The signal loopback circuit according to supplementary note 1, wherein the first coupler is arranged at the channel of the first direction where an optical signal of the first wavelength band and an optical signal of the second wavelength band have been multiplexed, and the second coupler is arranged at the channel of the second direction where an optical signal of the first wavelength band and an optical signal of the second wavelength band have been multiplexed, and the first filter loops back the monitoring signal of at least one of the first and second wavelength bands.

(Supplementary Note 4)

The signal loopback circuit according to supplementary note 1, further including a second filter that is used in the channel of the second direction and that extracts at least one of a monitoring signal of the first wavelength band and a monitoring signal of the second wavelength band, wherein the first coupler is arranged at the channel of the first direction where an optical signal of the first wavelength band and an optical signal of the second wavelength band have been multiplexed, and the second coupler is arranged at the channel of the second direction where an optical signal of the first wavelength band and an optical signal of the second wavelength band have been multiplexed, the second coupler splits an optical signal in the channel of the second direction, and inputs the split optical signal to the second filter, and the first coupler combines, to the first channel, a monitoring signal extracted by the second filter.

(Supplementary Note 5)

The signal loopback circuit according to supplementary note 3 or 4, wherein the first filter extracts a monitoring signal of the first wavelength band and a monitoring signal of the second wavelength band.

(Supplementary Note 6)

The signal loopback circuit according to supplementary note 3 or 4, wherein the first filter extracts only one of a monitoring signal of the first wavelength band and a monitoring signal of the second wavelength band.

(Supplementary Note 7)

A relay device including:

a first multiplexing-demultiplexing device that separates a wavelength-multiplexed optical signal propagating in the first direction, into an optical signal of the first wavelength band and an optical signal of the second wavelength band;

a second multiplexing-demultiplexing device that couples an optical signal of the first wavelength band and an optical signal of the second wavelength band that are separated by the first multiplexing-demultiplexing device;

a third multiplexing-demultiplexing device that separates a wavelength-multiplexed optical signal propagating in the second direction, into an optical signal of the first wavelength band and an optical signal of the second wavelength band;

a fourth multiplexing-demultiplexing device that couples an optical signal of the first wavelength band and an optical signal of the second wavelength band that are separated by the third multiplexing-demultiplexing device; and the signal loopback circuit according to any one of supplementary notes 1 to 6.

(Supplementary Note 8)

The relay device according to supplementary note 7, further including optical amplifiers that amplify an optical signal of the first wavelength band and an optical signal of the second wavelength band separated by the first and third multiplexing-demultiplexing devices.

(Supplementary Note 9)

The relay device according to supplementary note 8, wherein the first coupler is arranged on an output side of the optical amplifiers that amplify an optical signal of the first wavelength band and an optical signal of the second wavelength band that are separated by the first multiplexing-demultiplexing device.

(Supplementary Note 10)

A signal loopback method of making connection between a channel of a first direction and a channel of a second direction, through which an optical signal of a first wavelength band and an optical signal of a second wavelength band are transmitted, including:

splitting an optical signal of the channel of the first direction;

extracting, from the split optical signal, at least one of a monitoring signal of the first wavelength band and a monitoring signal of the second wavelength band that are used in the channel of the first direction; and combining the extracted monitoring signal to a channel of second direction.

(Supplementary Note 11)

The signal loopback method according to supplementary note 10, including:

separating an optical signal in the first channel, for each of a channel of an optical signal of the first wavelength band and a channel of an optical signal of the second wavelength band; and extracting the monitoring signal, for each of the channel of an optical signal of the first wavelength band and the channel of an optical signal of the second wavelength band.

(Supplementary Note 12)

The signal loopback method according to the supplementary note 10, including:

separating an optical signal in the channel of the first direction in which an optical signal of the first wavelength band and an optical signal of the second wavelength band have been multiplexed;

extracting the monitoring signal of at least one of the first and second wavelength bands, from the split signal in the channel of the first direction; and coupling, to the channel of the second direction, the monitoring signal extracted from the signal in the channel of the first direction.

(Supplementary Note 13)

The signal loopback method according to the supplementary note 10, including:

separating an optical signal in the channel of the second direction in which an optical signal of the first wavelength band and an optical signal of the second wavelength band have been multiplexed;

extracting the monitoring signal of at least one of the first and second wavelength bands, from the split signal in the channel of the second direction; and coupling, to the channel of the first direction, the monitoring signal extracted from the signal in the channel of the second direction.

(Supplementary Note 14)

The signal loopback method according to the supplementary note 12 or 13, including:

extracting a monitoring signal of the first wavelength band and a monitoring signal of the second wavelength band from the split signal in the channel of the first direction.

(Supplementary Note 15)

The signal loopback method according to the supplementary note 12 or 13, including:

extracting only one of a monitoring signal of the first wavelength band and a monitoring signal of the second wavelength band, from the split signal in the channel of the first direction.

Although the invention of the present patent application is described above with reference to the example embodiments, the invention of the present patent application is not limited to the above-described example embodiments. Various modifications that can be understood by those skilled in the art can be made on a configuration and details of the invention of the present patent application within the scope of the invention of the present patent application.

Further, the configurations described in the respective example embodiments are not necessarily mutually exclusive. The function and advantageous effect of the present invention may be achieved by a combination of all or a part of the above-described example embodiments.

The present patent application claims priority based on Japanese Patent Application No. 2016-067181 filed on Mar. 30, 2016, the disclosure of which is incorporated herein in its entirety.

REFERENCE SIGNS LIST 100, 200, 300, 400, 500, 900 Relay device
111 to 114 Multiplexing-demultiplexing device
121 to 124, 901, 902 Optical amplifier
131 to 134, 211, 212, 311, 421, 511, 903, 904 Signal loopback circuit
141, 151, 241, 312 Coupler
142, 152, 242, 313, 315, 411, 412, 512 Reflecting element

The invention claimed is:

1. A signal loopback circuit that makes connection between a channel of a first direction and a channel of a second direction, through which an optical signal of a first wavelength band and an optical signal of a second wavelength band are transmitted, the signal loopback circuit comprising:
   a first coupler configured to split an optical signal in the channel of the first direction;
   a first filter that is used in the channel of the first direction and configured to extract, from an optical signal split by the first coupler, at least one of a monitoring signal of the first wavelength band and a monitoring signal of the second wavelength band; and
   a second coupler configured to combine, to the channel of the second direction, a monitoring signal extracted by the first filter.

2. The signal loopback circuit according to claim 1, wherein
   the first and second couplers and the first filter are arranged for each of a channel of an optical signal of the first wavelength band and a channel of an optical signal of the second wavelength band that are separated, and the first filter extracts the monitoring signal of a wavelength band of a channel at which the first filter is arranged.

3. The signal loopback circuit according to claim 1, wherein
   the first coupler is arranged at the channel of the first direction where an optical signal of the first wavelength band and an optical signal of the second wavelength band are multiplexed, and the second coupler is arranged at the channel of the second direction where an optical signal of the first wavelength band and an optical signal of the second wavelength band are multiplexed, and
   the first filter loops back the monitoring signal of at least one of the first and second wavelength bands.

4. The signal loopback circuit according to claim 1, further comprising a second filter that is used in the channel of the second direction and configured to extract at least one of a monitoring signal of the first wavelength band and a monitoring signal of the second wavelength band, wherein
   the first coupler is arranged at the channel of the first direction where an optical signal of the first wavelength band and an optical signal of the second wavelength band are multiplexed, and the second coupler is arranged at the channel of the second direction where an optical signal of the first wavelength band and an optical signal of the second wavelength band are multiplexed, the second coupler splits an optical signal in the channel of the second direction, and inputs the split optical signal to the second filter, and the first coupler combines, to the channel of the first direction, a monitoring signal extracted by the second filter.

5. The signal loopback circuit according to claim 3, wherein the first filter extracts a monitoring signal of the first wavelength band and a monitoring signal of the second wavelength band.

6. The signal loopback circuit according to claim 3, wherein the first filter extracts only one of a monitoring signal of the first wavelength band and a monitoring signal of the second wavelength band.

7. A relay device comprising:
a first multiplexing-demultiplexing device configured to separate a wavelength-multiplexed optical signal propagating in the first direction, into an optical signal of the first wavelength band and an optical signal of the second wavelength band;
a second multiplexing-demultiplexing device configured to couple an optical signal of the first wavelength band and an optical signal of the second wavelength band that are separated by the first multiplexing-demultiplexing device;
a third multiplexing-demultiplexing device configured to separate a wavelength-multiplexed optical signal propagating in the second direction, into an optical signal of the first wavelength band and an optical signal of the second wavelength band;
a fourth multiplexing-demultiplexing device configured to couple an optical signal of the first wavelength band and an optical signal of the second wavelength band that are separated by the third multiplexing-demultiplexing device; and
the signal loopback circuit according to claim 1.

8. The relay device according to claim 7, further comprising optical amplifiers configured to amplify an optical signal of the first wavelength band and an optical signal of the second wavelength band that are separated by the first and third multiplexing-demultiplexing devices.

9. The relay device according to claim 8, wherein the first coupler is arranged on an output side of optical amplifiers that amplify an optical signal of the first wavelength band and an optical signal of the second wavelength band that are separated by the first multiplexing-demultiplexing device.

10. A signal loopback method of making connection between a channel of a first direction and a channel of a second direction, through which an optical signal of a first wavelength band and an optical signal of a second wavelength band are transmitted, the signal loopback method comprising:
splitting an optical signal in the channel of the first direction;
extracting, by an optical filter, from the split optical signal, at least one of a monitoring signal of the first wavelength band and a monitoring signal of the second wavelength band that are used in the channel of the first direction; and
combining the extracted monitoring signal to the channel of the second direction.

11. The signal loopback method according to claim 10, further comprising:
separating an optical signal in the channel of the first direction, for each of a channel of an optical signal of the first wavelength band and a channel of an optical signal of the second wavelength band; and
extracting the monitoring signal, for each of a channel of an optical signal of the first wavelength band and a channel of an optical signal of the second wavelength band.

12. The signal loopback method according to claim 10, further comprising:
separating an optical signal in the channel of the first direction in which an optical signal of the first wavelength band and an optical signal of the second wavelength band are multiplexed;
extracting the monitoring signal of at least one of the first and second wavelength bands, from the split signal in the channel of the first direction; and
coupling, to the channel of the second direction, the monitoring signal extracted from a signal in the channel of the first direction.

13. The signal loopback method according to claim 10, further comprising:
separating an optical signal in the channel of the second direction in which an optical signal of the first wavelength band and an optical signal of the second wavelength band are multiplexed;
extracting the monitoring signal of at least one of the first and second wavelength bands, from the split signal in the channel of the second direction; and
coupling, to the channel of the first direction, the monitoring signal extracted from a signal in the channel of the second direction.

14. The signal loopback method according to claim 12, further comprising:
extracting a monitoring signal of the first wavelength band and a monitoring signal of the second wavelength band from the split signal in the channel of the first direction.

15. The signal loopback method according to claim 12, further comprising:
extracting only one of a monitoring signal of the first wavelength band and a monitoring signal of the second wavelength band, from the split signal in the channel of the first direction.

* * * * *